United States Patent [19]
Watanabe et al.

[11] Patent Number: 6,042,071
[45] Date of Patent: *Mar. 28, 2000

[54] FUEL CYLINDER ATTACHING STRUCTURE IN MOTORCAR

[75] Inventors: Hideo Watanabe; Ryutaro Shinohara; Yutaka Kanaguchi; Tooru Wako; Shinya Murabayashi, all of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/054,530

[22] Filed: Apr. 3, 1998

[30] Foreign Application Priority Data

Apr. 7, 1997 [JP] Japan .................................. 9-088312

[51] Int. Cl.⁷ .............................. A47G 23/02; A47K 1/08; B60P 3/22; B60K 15/10
[52] U.S. Cl. .......................... 248/313; 248/154; 280/834; 180/69.5
[58] Field of Search .................................... 248/146, 154, 248/230.8, 230.9, 313, 316.1

[56] References Cited

U.S. PATENT DOCUMENTS

| | | | |
|---|---|---|---|
| 3,239,175 | 3/1966 | Seibel | 248/499 |
| 5,330,031 | 7/1994 | Hill et al. | 180/271 |
| 5,518,272 | 5/1996 | Fukagawa et al. | 280/834 |
| 5,794,979 | 8/1998 | Kasuga et al. | 280/834 |
| 5,810,309 | 9/1998 | Augustine | 248/313 |

*Primary Examiner*—Ramon O. Ramirez
*Assistant Examiner*—Michael Nornberg
*Attorney, Agent, or Firm*—Armstrong, Westerman, Hattori, McLeland & Naughton

[57] ABSTRACT

A fuel cylinder attaching structure in a motorcar can cope with a large expansive deformation of the fuel cylinder and fixedly support the fuel cylinder surely. The structure comprises a pair of front and rear supporting frame members fixed on a car-body; a fixing band fixed to the front and rear supporting frame members, wound round the fuel cylinder; and both ends of the fixing band connected to each other with a spring interposed, positioned on a vertical bisection of a line segment extending between the front and rear attach-supporting sections.

2 Claims, 4 Drawing Sheets

FUEL CYLINDER ATTACHING STRUCTURE IN MOTORCAR

BACKGROUND OF THE INVENTION

The present invention relates to a fuel cylinder attaching structure in a motorcar running by a gas fuel such as natural gas.

A fuel cylinder or tank to be mounted on a natural gas vehicle is one such as a light weight aluminum liner tank or non-metallic liner tank which is expanded and deformed when filled with the fuel.

As a method for mounting and fixing such a fuel cylinder which expands and contracts itself onto a vehicle, a practice to fasten the fuel cylinder by a fixing band with spring is known. FIGS. 4 and 5 show rough construction of the fixing band.

A fixing band 01 shown in FIG. 4 is formed in a circular having both ends 01a, 01b positioned at an upper part and a central lower part fixed to a car-body. At the both ends 01a, 01b are fixed stays 02a, 02b opposite to each other and a clamp bolt 03 penetrates the stays 02a, 02b interposing a spring 05 between the bolt and the stay. A nut 04 is engaged with the bolt 03 to clamp the stays 02a, 02b.

Since the stays are clamped through the spring 05, even if the fuel cylinder expand or contract, the diameter of the fixing band changes flexibly by elastic deformation of the spring 05 to follow the deformation of the fuel cylinder so that the fuel cylinder can be fixed by clamping force of the spring 05 acting always.

In FIG. 5, a fixing band is divided into an upper fixing band section 010 and a lower fixing band section 011, and a central lower part of the lower fixing band section is fixed to the car-body. A stay 010a at an end of the upper fixing band section 010 and a stay 011a at an end of the lower fixing band section 011 are clamped by a bolt 012a and a nut 013a through a spring 014a, and a stay 010b at another end of the upper fixing band section 010 and a stay 011b at another end of the lower fixing band section 011 are clamped by a bolt 012b and a nut 013b through a spring 014b.

In each of the above both cases, the fixing band 01 (011) is fixed at one spot 01c (011c) to make the diameter change of the fixing band uniform for pertinently coping with the expansive deformation of the fuel cylinder.

However, according to the above fixing band fixed to the car-body at one spot, though it is possible to cope with the expansive deformation of the fuel cylinder, it is difficult to fix the fuel cylinder surely against vibration and other forces given to the fuel cylinder.

Heretofore, a fuel cylinder supporting structure having a pair of front and rear supporting frames fixed with respective fixing bands is known, but this structure is one for a fuel cylinder expanding little and therefore a clamp with spring is not used in the structure.

SUMMARY OF THE INVENTION

The present invention has been accomplished in view of the foregoing and one object of the invention is to provide a fuel cylinder attaching structure in a motorcar which can cope with a large expansive deformation of the fuel cylinder and fixedly support it surely.

In order to attain the above object, the present invention provides a fuel cylinder attaching structure in a motorcar having a fuel cylinder for storing a compressed fuel gas mounted thereon, comprising a pair of front and rear supporting frame members fixed on a car-body; a fixing band fixed to the front and rear supporting frame members at respective attach-supporting sections of the members, wound round the fuel cylinder; and both ends of the fixing band connected to each other with a spring interposed, positioned on a vertical bisection of a line segment extending between the front and rear attach-supporting sections.

According to this fuel cylinder attaching structure, a front part of the fixing band between the front attach-supporting section and the connected ends and a rear part of the fixing band between the rear attach-supporting section and the connected ends are symmetrical with respect to the vertical bisection. On the one hand, the fuel cylinder is expanded symmetrically with respect to the vertical bisection. Therefore, when the fuel cylinder is expanded greatly, the fixing band enlarges its diameter, owing to elastic deformation of the spring, touching the outer surface of the fuel cylinder equally to fasten the fuel cylinder uniformly, so that the fuel cylinder can be fixed and supported stably always.

Since the fuel cylinder is supported so as to be pinched by the front and rear supporting frame members, it is possible to fix the fuel cylinder firmly against vibration and other forces given to the fuel cylinder.

According to the above fuel cylinder attaching structure which comprises clamp stays provided at the both ends respectively, a bolt penetrating the clamp stays and a nut engaging with the bolt, and in which the spring is interposed between one of the clamp stays and the bolt or nut, the both clamp stays can be connected by a simple construction of the bolt and nut utilizing resilient force of the spring.

According to the above fuel cylinder attaching structure wherein the fixing band is divided into a plurality of band sections which are connected with each other for surrounding the fuel cylinder, fastening force of the fuel cylinder by the fixing band can be adjusted pertinently.

DETAILED DESCRIPTION OF THE PREFERRED EMBODIMENT

Hereinafter, a preferred embodiment of the present invention will be described with reference to FIGS. 1 to 3.

Figure 1:
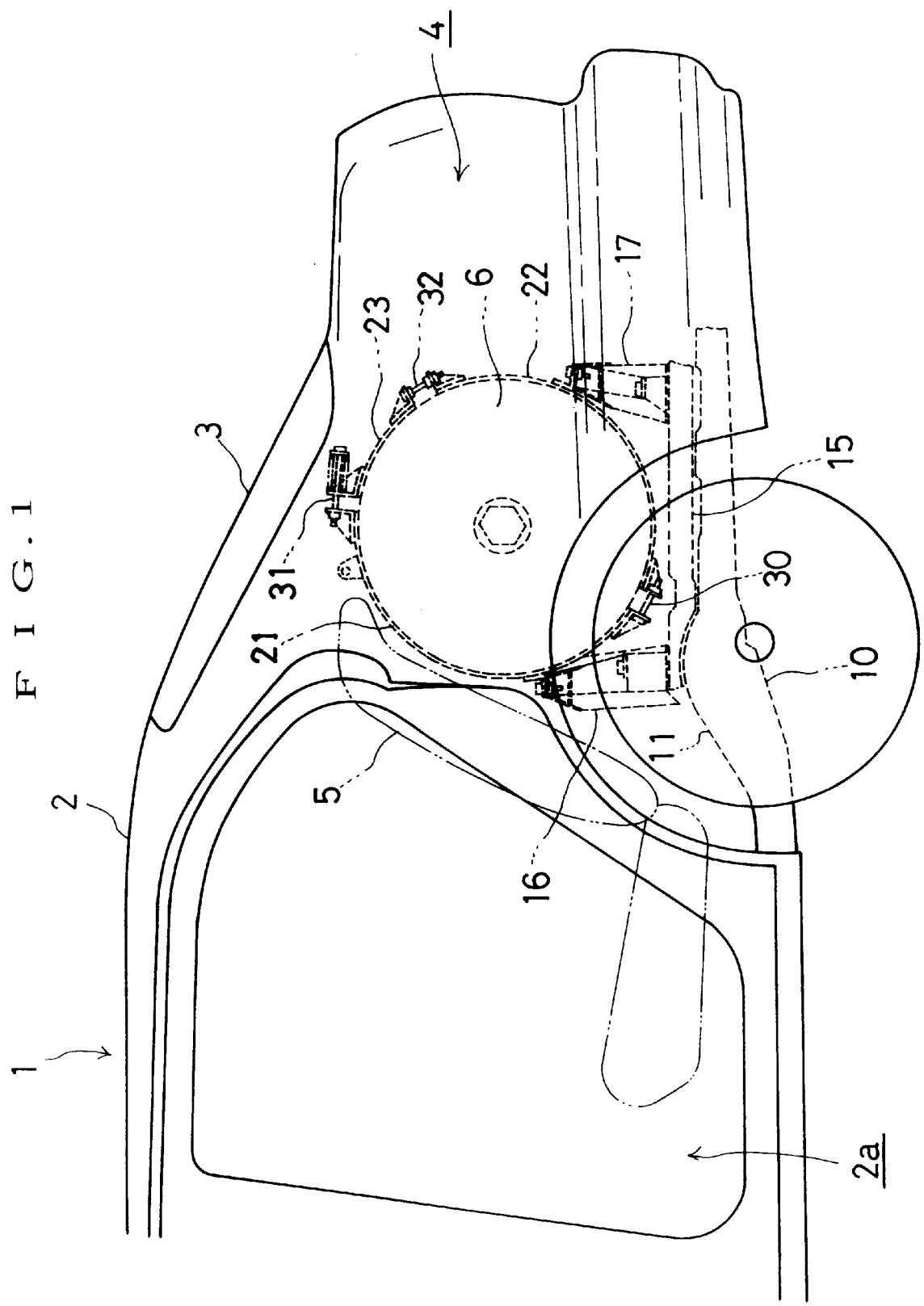
FIG. 1 is a partly omitted side view showing a rear half of a motorcar according to a preferred embodiment of the present invention.

FIG. 1 is a partly omitted side view showing a rear half of a motorcar 1 according to the embodiment. This motorcar 1 runs using natural gas as its fuel and has a compressed fuel cylinder 6 for storing the compressed natural gas mounted thereon.

A car-body 2 of the motorcar 1 has a large door opening 2a for a rear door formed on a side of a rear half part at a position near the center, a rear window 3 fitted to a rear part of a roof and a trunk room 4 formed at a swelled portion under and behind the rear window. Within the trunk room 4 and in rear of a seat back 5 of a rear seat is disposed a fuel cylinder 6.

On the bottom portion at the rear half of the car-body is formed a pair of right and left car-body side frames 10 extending in before-and-behind direction and a rear floor 11 supported on the side frames 10. On the rear floor 11 is fixed the fuel cylinder through a supporting frame.

Figure 2:
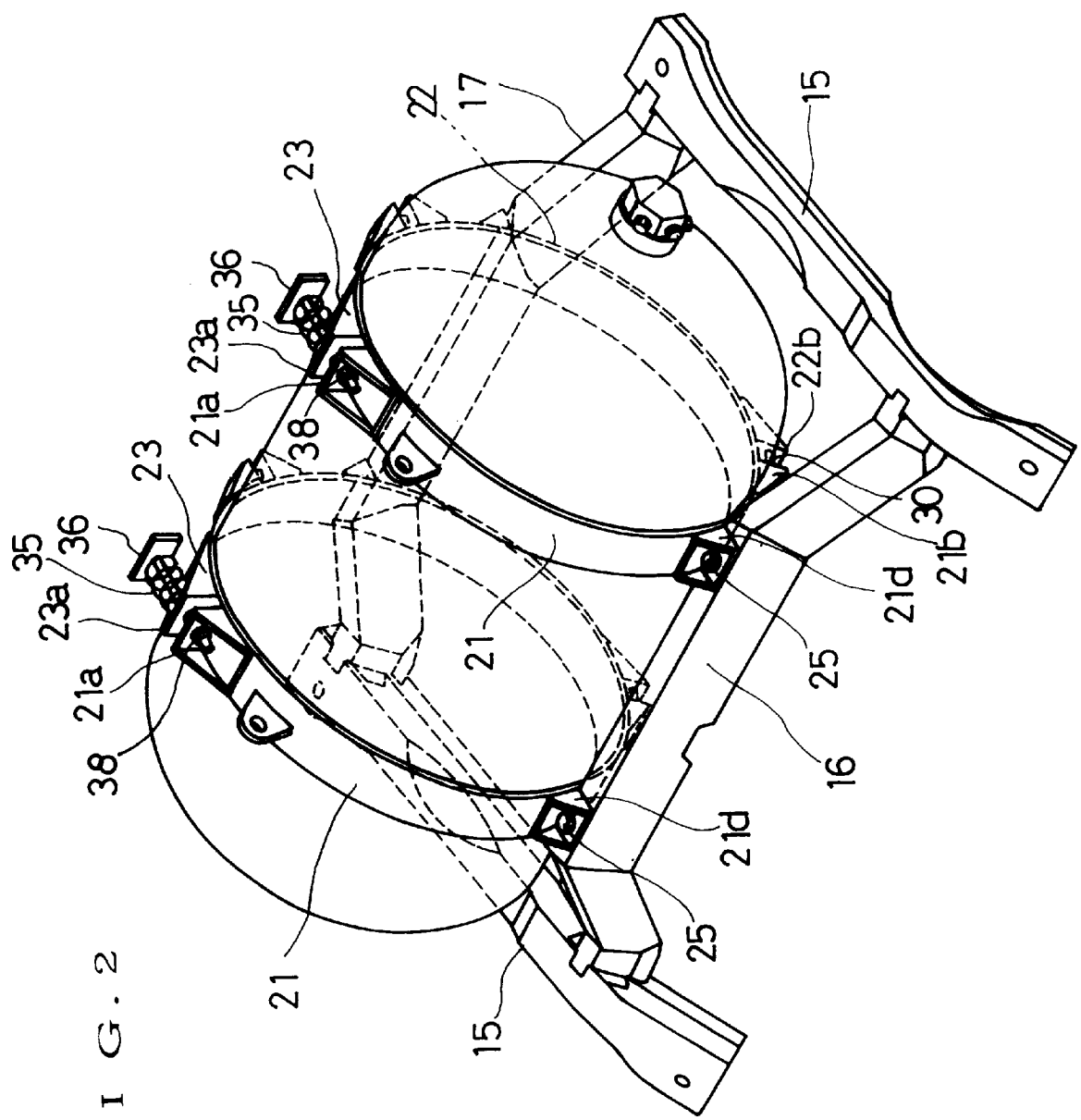
FIG. 2 is a perspective view showing a fuel cylinder attaching structure.
Figure 3:
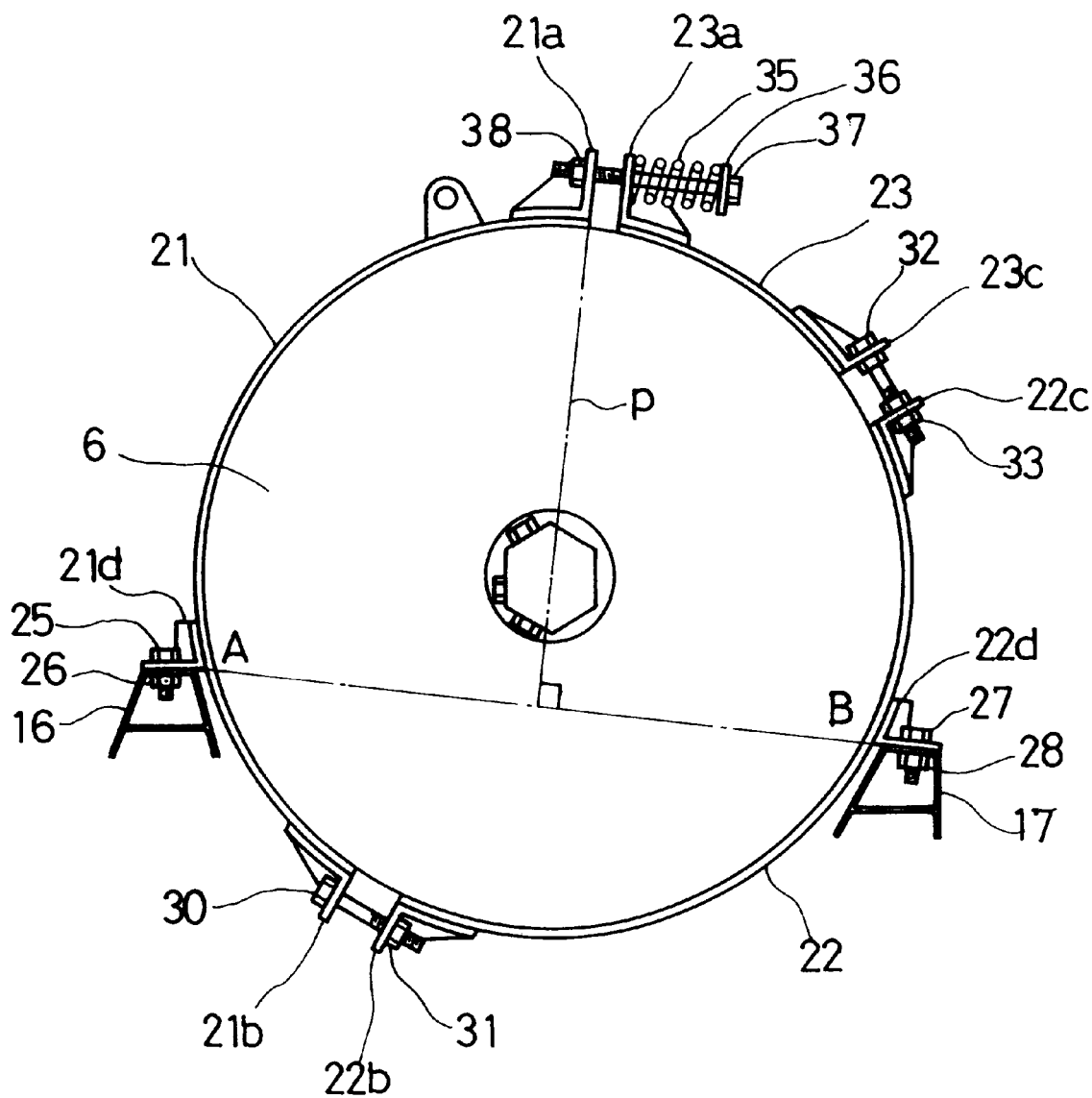
FIG. 3 is a sectional side view thereof.
Figure 4:
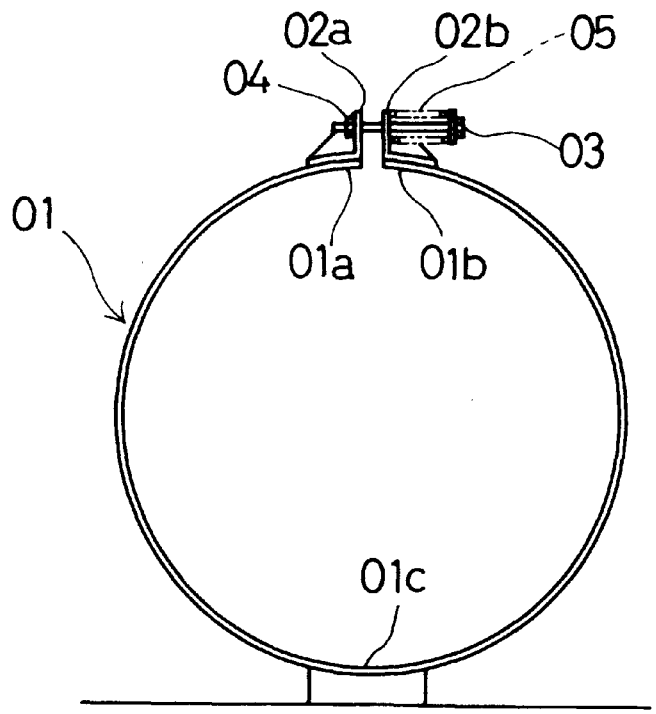
FIG. 4 is a rough side view showing a conventional fuel cylinder attaching structure.
Figure 5:
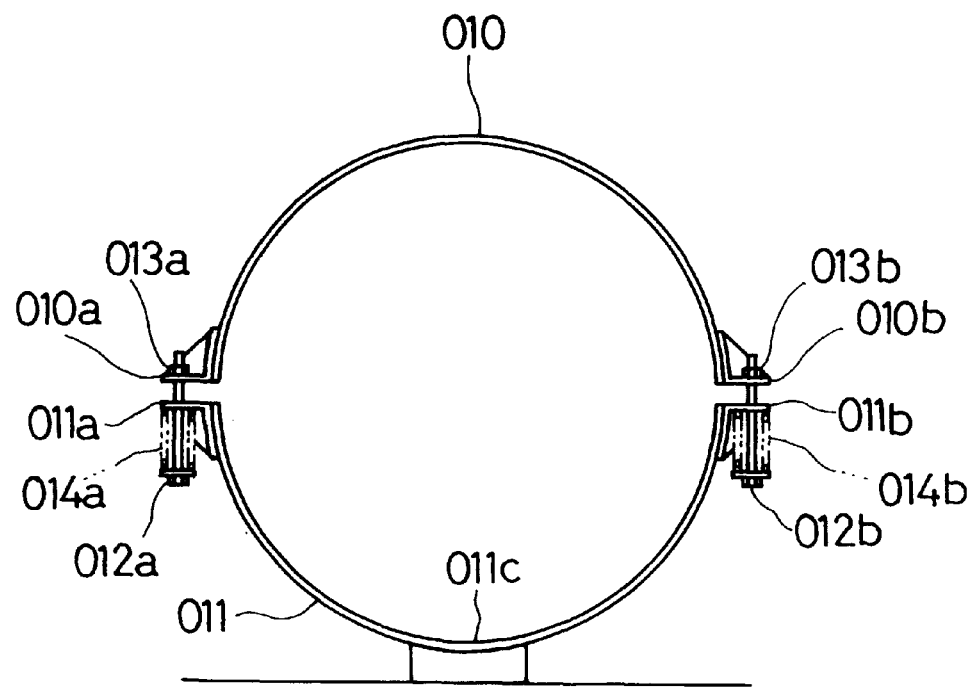
FIG. 5 is a rough side view showing another conventional fuel cylinder attaching structure.

As shown in FIG. 2, the supporting frame for supporting the fuel cylinder 6 is constituted by assembling a pair of right and left side supporting frame members 15, 15 elongated in before-and-behind direction of the car-body and a pair of front and rear supporting frame members 16, 17 elongated in widthwise direction of the car-body. The side supporting frame members 15, 15 are previously fixed to the both side portions of the rear floor 11 by means of bolts and nuts at the front and the rear.

The front supporting frame member 16 and the rear supporting frame member 17 are fixed to the fuel cylinder 6 by a pair of right and left fixing bands and jointly fixed to the side supporting frame members 15, 15.

Each of the front and rear supporting frame members 16, 17 is of a bridge-like shape having a high horizontal central part and right and left end parts extending obliquely downward and outward to be fixed to the right and left side supporting frame members 15, 15. The front supporting frame member 16 is positioned somewhat higher than the rear supporting frame member 17 (FIG. 3).

Each of the right and left fixing bands is made of steel and divided into three arcuate sections, a front band section 21, a rear band section 22 and a subsidiary band section 23. The front band section 21 and the rear band section 22 have the same length and the subsidiary band section 23 is the shortest.

At the both ends of the front band section 21 are welded clamp stays 21a, 21b. Similarly, clamp stays 22b,22c are welded at the both ends of the rear band section 22 and clamp stays 23c, 23a at the both ends of the subsidiary band section 23.

At predetermined positions on outer surfaces of the front and rear band sections 21, 22 are welded and projected attachment stays 21d, 22d. On inner surfaces of the band sections 21, 22, 23 are affixed elastic members having large coefficient of friction.

The front band sections 21, 21 are attached to the front supporting frame member 16 with the attachment stays 21d, 21d fixed to the right and left sides of the central horizontal part of the frame member 16 by means of bolts 25 and nuts 26. Similarly, the rear band sections 22, 22 are attached to the rear supporting frame member 17 with the attachment stays 22d, 22d fixed to the right and left sides of the central horizontal part of the frame member 17 by means of bolts 27 and nuts 28.

After a position of axis of the fuel cylinder 6 is set by a jig, the front band sections 21, 21 attached to the front supporting frame member 16 and the rear band sections 22, 22 attached to the rear supporting frame member 17 are fitted around the fuel cylinder 6 at respective predetermined positions, then the clamp stays 21b, 22b opposed to each other at the bottom are preliminarily clamped by clamping bolts 30 and nuts 31.

A space formed between respective upper ends of the front and rear band sections 21, 22 connected at the bottom is supplemented by the subsidiary band section 23, and the clamp stays 22c, 23c of the band sections 22, 23 opposed to each other are preliminarily clamped by clamping bolts 32 and nuts 33.

The clamp stays 21a, 23a of the band sections 21, 23 opposed to each other are preliminarily clamped by a clamping bolt 37 passing through the clamp stays 21a, 23a with a spring 35 and a washer 36 interposed between an end of the bolt and the clamp stay 23a, and a nut 38 engaging with another end of the bolt.

Thus, the fuel cylinder is surrounded by a band fixed to the front supporting frame member 16 and the rear supporting frame member 17.

Next, clearance of the clamp stays 22c, 23c of the rear band section 22 and the subsidiary band section opposed to each other is adjusted by the bolt 32 and nut 33 so that the clamp stays 21a, 23a of the front band section 21 and the subsidiary band section 23 opposed to each other is positioned substantially on a vertical bisection (the straight line p in FIG. 3) of a line segment (the line A-B in FIG. 3) extending between the attachment stays 21d and 22d which are attach-supporting sections of the fixing band to the front supporting frame member 16 and the rear supporting frame member 17 respectively.

Then, clearance of the preliminarily clamped lower clamp stays 21b, 22b of the front band section 21 and the rear band section 22 is suitably adjusted by the bolt 30 and nut 31, and the preliminarily clamped clamp stays 21a, 23a of the front band section 21 and the subsidiary band section 23 are adjusted by the bolt 37 and nut 38 so that the spring 35 brings about a suitable resilient force.

The fuel cylinder 6 attached to the front supporting frame member 16 and the rear supporting frame member 17 in a body in such a manner as described above is inserted into the car-body through the door opening 2a for a rear door, moved rearward to the trunk room. Then the front supporting frame member 16 and the rear supporting frame member 17 are laid on the right and left side supporting members 15, 15 previously fixed on the rear floor 11 and fixed to the side supporting frame members by bolts.

When the fuel cylinder 6 filled with natural gas is expanded greatly, the spring 35 clamping the clamp stays 21a, 23a of the front band section 21 and the subsidiary band section 23 absorbs the expansion so that the fixing band can enlarge its diameter to fasten the fuel cylinder 6 as before.

Since the clamp stays 21a, 23a are positioned on the vertical bisection p of the line segment A-B extending between the attachment stays 21d, 22d which are the attach-supporting sections of the fixing band, the front part of the fixing band between the front attachment stay 21d and the clamp stay 21a and the rear part of the fixing band between the rear attachment stay 22d and the clamp stay 23a are symmetrical with respect to the vertical bisection p. Therefore the fixing band enlarges its diameter touching the outer surface of the fuel cylinder 6 equally to fasten the fuel cylinder uniformly, so that the fuel cylinder can be fixed stably always.

Since the fuel cylinder 6 is supported so as to be pinched by the front and rear supporting frame members 16, 17, it is possible to fix the fuel cylinder firmly against vibration and other forces given to the fuel cylinder.

In addition, since the fixing band is divided into the front band section 21, the rear band section 22 and the subsidiary band section 23, and the front band section 21 and the rear band section 22 as well as the rear band section 22 and the subsidiary band section 23 are respectively connected clamped by the clamping bolts 30, 32, fastening of the fuel cylinder 6 can be adjusted pertinently.

What is claimed is:

1. A fuel cylinder attaching structure in a motorcar having an expandable and contractible fuel cylinder tank for storing a compressed fuel gas mounted thereon, comprising:

a pair of front and rear supporting frame members fixedly spaced on a car body for supporting said fuel tank at opposite sides of said fuel tank; and a fixing band wound around said fuel tank, said fixing band, when viewed horizontally from an end of said fuel tank, having a plurality of band sections, joined end-to-end around said fuel tank with oppositely facing stays fixed to end portions of outer surfaces of said band sections, and clamped with bolts extending through said facing stays and fastened with nuts, said band sections including a pair of front sections and a rear band section fixed to each of said front and rear supporting frame members and wound around said sides of said fuel tank.

2. A fuel cylinder attaching structure in a motor car, as claimed in claim 1, in which clamp stays at opposite ends of at least one of said clamp stays has a nut engaging said bolt, and a spring interposed between said at least one of said clamp stays and said bolt.

* * * * *